W. DUNN.
Boiler-Tube Cleaner.
No. 196,642. Patented Oct. 30, 1877.
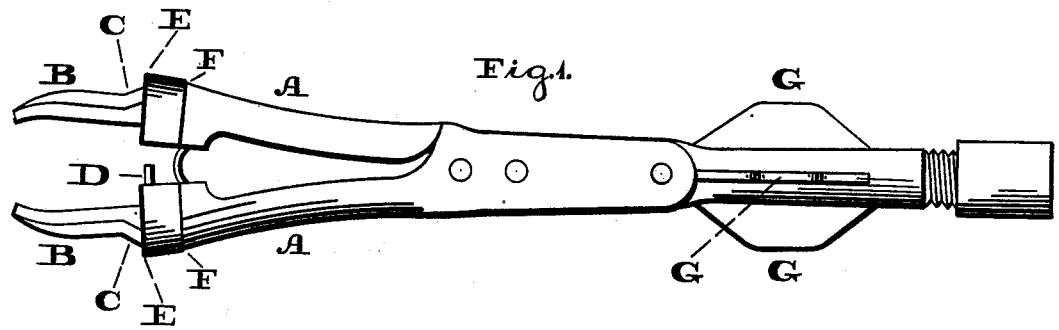
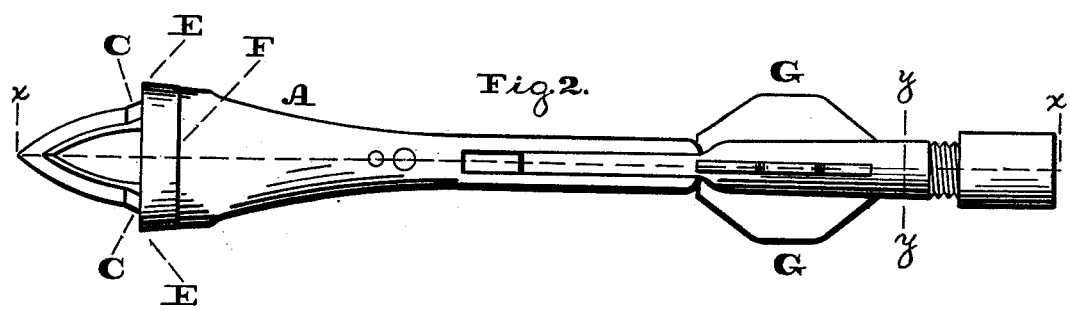
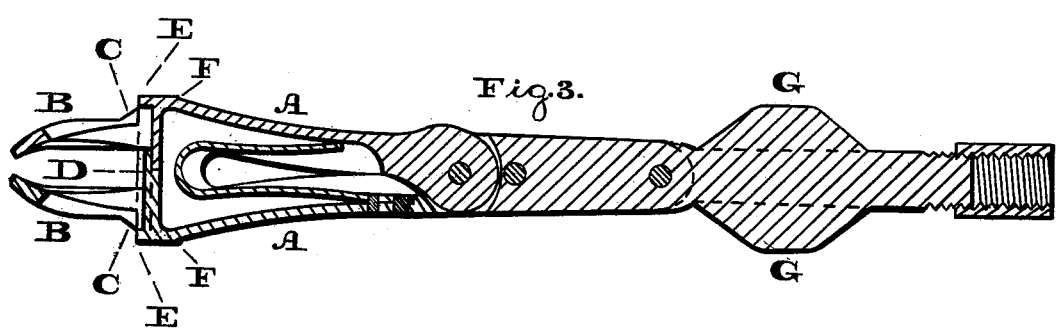
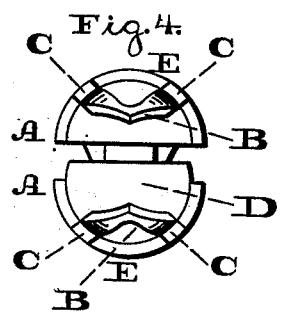
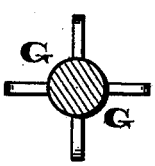
Witnesses:
Lewis F. Brous?
A. P. Grant
Inventor:
Wm. Dunn,
by John A. Wiedersheim,
Attorney.

UNITED STATES PATENT OFFICE.

WILLIAM DUNN, OF PHILADELPHIA, PA., ASSIGNOR OF ONE-HALF HIS RIGHT TO DANIEL B. RUFFNER, OF SAME PLACE.

IMPROVEMENT IN BOILER-TUBE CLEANERS.

Specification forming part of Letters Patent No. 196,642, dated October 30, 1877; application filed March 20, 1877.

*To all whom it may concern:*

Be it known that I, WILLIAM DUNN, of the city and county of Philadelphia, and State of Pennsylvania, have invented a new and useful Improvement in Boiler-Tube Cleaners, which improvement is fully set forth in the following specification and accompanying drawings, in which—

Figures 1 and 2 are side elevations of the device embodying my invention. Fig. 3 is a central longitudinal section thereof in line $x\ x$, Fig. 2. Fig. 4 is a front view thereof. Fig. 5 is a section in line $y\ y$, Fig. 2.

Similar letters of reference indicate corresponding parts in the several figures.

My invention consists of jaws having self-sharpening edges, and formed with noses, which, when inserted in the flues, automatically close the jaws, and with a plate which covers the opening previously existing at the base of the jaws, so that scrapings will be forced in advance of the cleaner.

It also consists of a shoulder for removal of scrapings that may be collected in the tubes in the rear of the implement.

Referring to the drawings, A represents two jaws, which are pivoted to each other, and of such shape that when they are closed they form a cone-shaped figure, said jaws being forced apart by a spring, either forming portion of one or both of the jaws, or separate therefrom, and properly connected to them, the opening motion of the jaws being limited by stops suitably applied.

The forward ends of the jaws have secured to or formed with them noses B, which project in the direction of the length of the jaws, and they are of tapering form, their diameters at the front ends being less than the widest portion of the jaws, and they swell, as at C, to the place of union with the jaws.

D represents a plate which projects from the base of one jaw right-angularly to the longitudinal direction of the implement, and it is adapted to project over the base of the other jaw.

The operation is as follows: The noses B are presented to the tubes and the implement forced thereinto, whereby, by the swell or tapering form of the noses, the jaws are gradually brought together and closed for operation, the bases of the conical jaws being in advance, and the scraping-edges E presenting themselves for action against the flues, the scraping and cleansing actions occurring by properly reciprocating, rotating, or otherwise manipulating the implement in the flues.

Owing to the conical form of the jaws, when the advance edges thereof wear off new edges present themselves, and thus the jaws may be said to be self-sharpening.

When the jaws close, the plate D covers the base of the opposite jaw, and, consequently, the opening previously existing at said base, thus preventing the admission of the scrapings rearward into the space between the two jaws, and causing said scrapings to be forced in advance of the jaws. Some scrapings may fall in the rear of the jaws or remain in the flues as the jaws are moved forward. In order, therefore, to remove the same, I form on the jaws shoulders F, which occupy positions on the outer faces of the jaws, some distance from the bases thereof, so that when the implement is being withdrawn from the flues the shoulders will carry out the scrapings.

In order to guide the jaws in the flues and prevent irregular motions thereof, I form, on the stock in the rear of the jaws, wings G G, which project from the stock and serve to keep the jaws true in the flue, and without interfering with the functions thereof.

It will be observed that the jaws A are conical from the shoulders F to the pivot or axial end of the jaws; but the bases of said jaws are cylindrical, and, as said bases wear away, new cutting or cleaning edges are constantly presented, thus producing self-sharpening jaws and two scraping-edges on opposite sides of the cylindrical portion, or one in advance and the other in rear of said portion, the purposes of which have been hereinbefore set forth.

Having thus described my invention, what I claim as new, and desire to secure by Letters Patent, is—

1. The conical jaws A, closing-noses B, and base-covering plate D, combined and operating substantially as and for the purpose set forth.

2. The conical jaws A, with cylindrical bases, closing-noses B, and base-covering plate D, combined and operating substantially as and for the purpose set forth.

3. The conical jaws, with the shoulders F on the cylindrical bases, substantially as and for the purpose set forth.

WILLIAM DUNN.

Witnesses:
JOHN A. WIEDERSHEIM,
H. E. HINDMARSH.